(12) United States Patent
Anderson et al.

(10) Patent No.: US 9,038,169 B2
(45) Date of Patent: *May 19, 2015

(54) METHOD AND SYSTEM FOR MANAGING AND CONTROLLING DIRECT ACCESS OF AN ADMINISTRATOR TO A COMPUTER SYSTEM

(71) Applicant: International Business Machines Corporation, Armonk, NY (US)

(72) Inventors: Eric M. Anderson, Friendswood, TX (US); Christopher J. Dawson, Arlington, VA (US); Leslie A. Nelson, Benson, NC (US); Brett W. Singletary, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/769,878

(22) Filed: Feb. 19, 2013

(65) Prior Publication Data

US 2014/0237588 A1  Aug. 21, 2014

(51) Int. Cl.
*G06F 21/31* (2013.01)
*G06F 15/16* (2006.01)
*G06F 21/45* (2013.01)

(52) U.S. Cl.
CPC .............. *G06F 21/31* (2013.01); *G06F 21/45* (2013.01)

(58) Field of Classification Search
CPC ............. G06F 21/31; G06F 21/6218; G06F 17/30424; G06F 11/1474; H04L 63/08; H04L 63/10

USPC ........... 726/1–10, 19, 21, 17; 705/7.13, 7.26, 705/304, 7.14; 713/1, 182, 185
See application file for complete search history.

(56) References Cited

U.S. PATENT DOCUMENTS

| 7,366,731 | B2 * | 4/2008 | Lewis et al. ........................... 1/1 |
| 8,185,550 | B1 * | 5/2012 | Eichler et al. ................. 707/783 |
| 2003/0220827 | A1 * | 11/2003 | Murphy ............................ 705/8 |
| 2004/0210469 | A1 * | 10/2004 | Jones et al. ....................... 705/8 |
| 2005/0289226 | A1 * | 12/2005 | Mohammed et al. ......... 709/208 |
| 2007/0115860 | A1 * | 5/2007 | Samele et al. ................ 370/259 |
| 2008/0215713 | A1 |  9/2008 | Cannon et al. |

(Continued)

OTHER PUBLICATIONS

Rajeev Gupta et al, Multi-dimentional Knowledge Integration for Efficient Incident Management in a Services Cloud, IEEE International Conference on Services Computing, 2009.*

(Continued)

*Primary Examiner* — Shewaye Gelagay
*Assistant Examiner* — Shanto M Abedin
(74) *Attorney, Agent, or Firm* — Edward P. Li; John Pivnichny

(57) ABSTRACT

A method and computer program product for managing and controlling direct access of an administrator to a computer system. At least one computer program on the computer system receives from the administrator a request for the direct access to the managed computer system directly from the system console and requests a service management system to search open tickets. In response to that the open tickets are found, the at least one computer program requests the administrator to choose at least one ticket from the open tickets and grants the administrator the direct access to the computer system in response to determining that the at least one ticket is valid.

18 Claims, 3 Drawing Sheets

(56) References Cited

U.S. PATENT DOCUMENTS

| | | | |
|---|---|---|---|
| 2008/0228504 A1* | 9/2008 | Nguyen et al. | 705/1 |
| 2009/0310764 A1* | 12/2009 | Gerhart | 379/142.04 |
| 2011/0289547 A1 | 11/2011 | Aggarwal et al. | |
| 2013/0073470 A1* | 3/2013 | White et al. | 705/304 |
| 2014/0067452 A1* | 3/2014 | Anderson et al. | 705/7.14 |

OTHER PUBLICATIONS

Quest Software Inc., "Developer and Administrator Access to Production" [online]. Copyright 2011 Quest Software Inc., [retrieved on May 10, 2012]. Retrieved from the internet:<URL: http://www.webcitation.org/67U3FkE1z>.

* cited by examiner

METHOD AND SYSTEM FOR MANAGING AND CONTROLLING DIRECT ACCESS OF AN ADMINISTRATOR TO A COMPUTER SYSTEM

FIELD OF THE INVENTION

The present invention relates generally to computer service management technologies and tools, and more particularly to managing and controlling direct access of an administrator to a computer system.

BACKGROUND

In computer service management, a service management ticketing system is used for managing and maintaining tickets such as incident, problem, and change tickets. The service management ticketing system ensures that administrator tasks of service management on a managed computer system are performed in a specific order. However, there is no way to prevent an administrator from logging onto the managed computer system and carrying out a task without a valid service management ticket. In computer service management, there is a demand for managing and controlling administrator access to managed computer systems. Currently known solutions are related to access restrictions.

SUMMARY

Embodiments of the present invention provide a method and computer program product for managing and controlling direct access of an administrator to a computer system. At least one computer program on the computer system receives from the administrator a request for the direct access to the computer system directly from the system console. The at least one computer program requests a service management system to search open tickets. In response to that the open tickets are found, the at least one computer program requests the administrator to choose at least one ticket from the open tickets. The at least one computer program checks status of the at least one ticket to determine whether the at least one ticket is valid. And, in response to determining that the at least one ticket is valid, the at least one computer program grants the administrator the direct access to the computer system.

DETAILED DESCRIPTION

Figure 1:
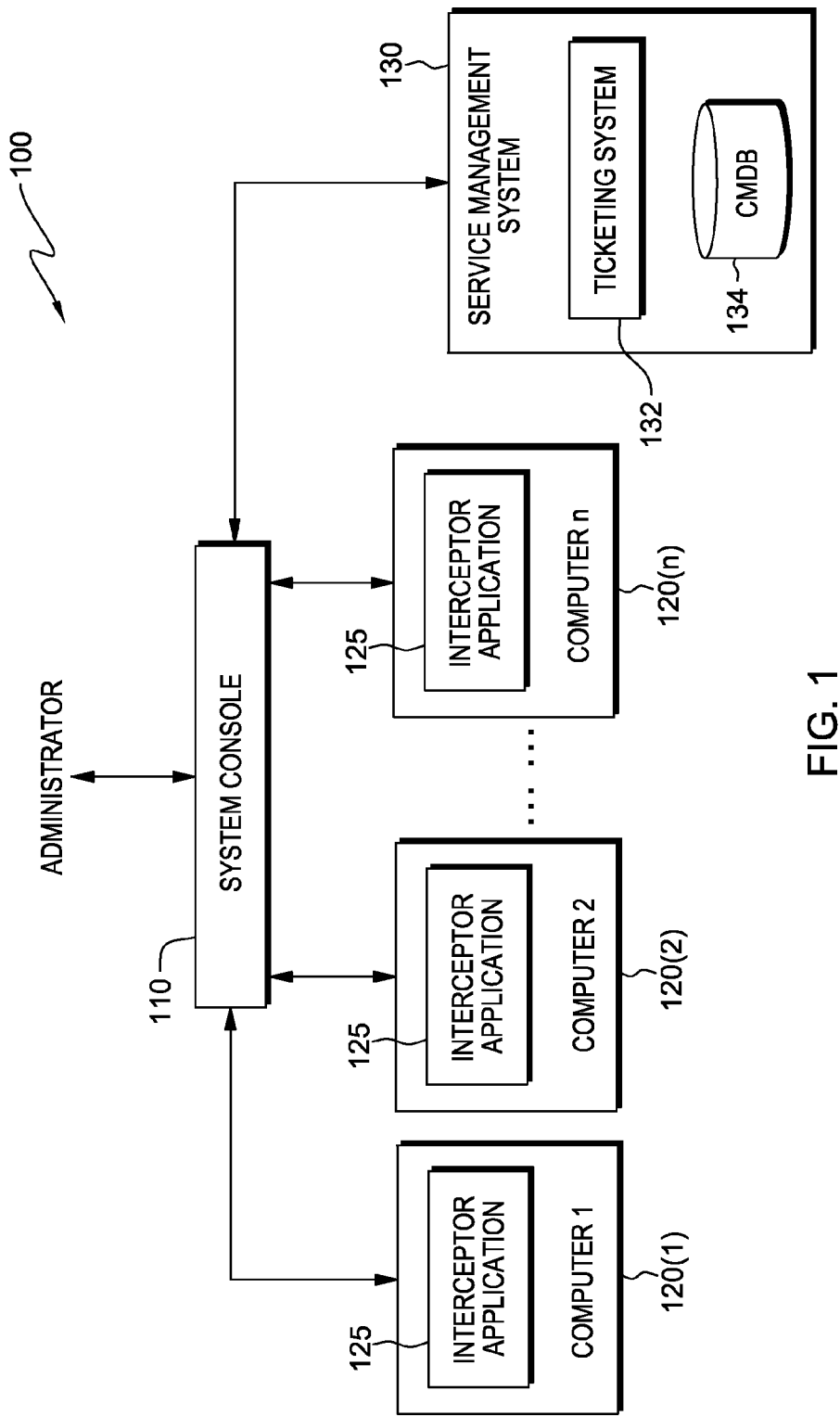
FIG. 1 is a diagram illustrating a system for managing and controlling direct access of an administrator to computer systems from a system console, in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram illustrating system 100 for managing and controlling direct access of an administrator to computer systems 120 from system console 110, in accordance with an exemplary embodiment of the present invention. System 100 includes one or more computer systems 120, and service management system 130. Each of one or more computer systems 120 includes interceptor application 125. System console 110 is the entry and display device for system administration messages. Service management system 130 includes ticketing system 132 and configuration management database (CMDB) 134. In the exemplary embodiment, service management ticketing system 132 and CMDB 134 are hosted by one computer device. In other embodiments, service management ticketing system 132 and CMDB 134 may reside on two separate computer devices, respectively.

In the exemplary embodiment, the direct access is that an administrator accesses directly a specific one of one or more computer systems 120, e.g. computer system 1 120(1), via system console 110. In other embodiments, the direct access is that the administrator uses a VPN (virtual private network) or other mechanisms to bypass any boundary check and to access directly the specific one of one or more computer systems 120.

Interceptor application 125 is software including at least one computer program which resides on each of one or more computer systems 120. In the exemplary embodiment, interceptor application 125 intercepts the direct access of the administrator from system console 110 onto one or more computer systems 120. Interceptor application 125 on each of one or more computer systems 120 communicates with ticketing system 132 on service management system 130 via an application programming interface (API) such as XML (extensible markup language), SOAP (simple object access protocol), web services, or others.

In the exemplary embodiment, when a request for direct access to a specific one of computer systems 120, e.g. computer 1 120(1), is made by an administrator at system console 110, interceptor application 125 on computer 1 120(1) sends the administrator at system console 110 a warning message that the administrator is accessing a computer system under access restriction. This message may be presented using a banner, a pop-up, or other communication.

In response to receiving from the administrator the request for direct access to the specific one of computer systems 120, e.g. computer 1 120(1), interceptor application 125 on the specific one of computer systems 120 requests ticketing system 132 on service management system 130 to search open service management tickets for the specific one of computer systems 120. Service management tickets are managed by ticketing system 132 and stored on CMDB 134. The service management tickets include, for example, incident, problem, and change tickets. Each of the service management tickets is associated with a task of service management which is to be performed by the administrator.

Referring to FIG. 1, on service management system 130, ticketing system 132 searches the open service management tickets by querying CMDB 134. For example, a simple way of searching the open service management tickets is to search the text in descriptions of the open service management tickets. The text in the descriptions includes necessary information for identifying the specific one of computer systems 120, for example, the hostname and/or the IP address. As another example, a complex way of searching the open service management tickets is to search configuration items (CIs) of the specific one of computer systems 120. The CIs are tied to incident, problem, and change tickets.

Interceptor application 125 presents all the open service management tickets to the administrator and requests the administrator to choose at least one ticket from the open service management tickets. In order to perform a task of service management, the administrator must choose the at least one ticket from the open service management tickets. If the administrator chooses the at least one ticket, interceptor application 125 checks whether the at least one ticket is valid by checking status of the at least one ticket. For example, in the case of an incident ticket, interceptor application 125 checks whether the incident ticket has status of "open" and is assigned to a group or a user associated to the administrator. In response to determining that the status is "open" and the incident ticket is assigned to a group or a user associated to the administrator, interceptor application 125 determines that the change ticket is valid; otherwise, interceptor application 125 determines that the change ticket is not valid. Interceptor application 125 grants the administrator's direct access to the specific one of computer systems 120 in response to determining that the at least one ticket is valid. Otherwise, interceptor application 125 denies the administrator's direct access in response to determining that the at least one ticket is not valid.

In system 100 of the present invention, interceptor application 125 is capable of redirecting the administrator to ticketing system 132 on service management system 130. If the administrator is redirected to log onto ticketing system 132, a new ticket is generated for the administrator by ticketing system 132. Once interceptor application 125 receives the newly generated ticket from ticketing system 132, interceptor application 125 grants the administrator the direct access to the specific one of computer systems 120.

In system 100 of the present invention, interceptor application 125 records information of the administrator's direct access on a log. For example, the information recorded on the log includes information of who, when and why the administrator logs onto the specific one of computer systems 120. Interceptor application 125 transfers the information to ticketing system 132, and ticketing system 132 stores the information on CMDB 134.

In other embodiments of the present invention, interceptor application 125 may allow the administrator read-only access to the specific one of computer systems 120, under a situation where the at least one ticket chosen by the administrator is not valid. Interceptor application 125 logs the read-only access such that the administrator's activities beyond limitations of the read-only access are flagged.

Figure 2:
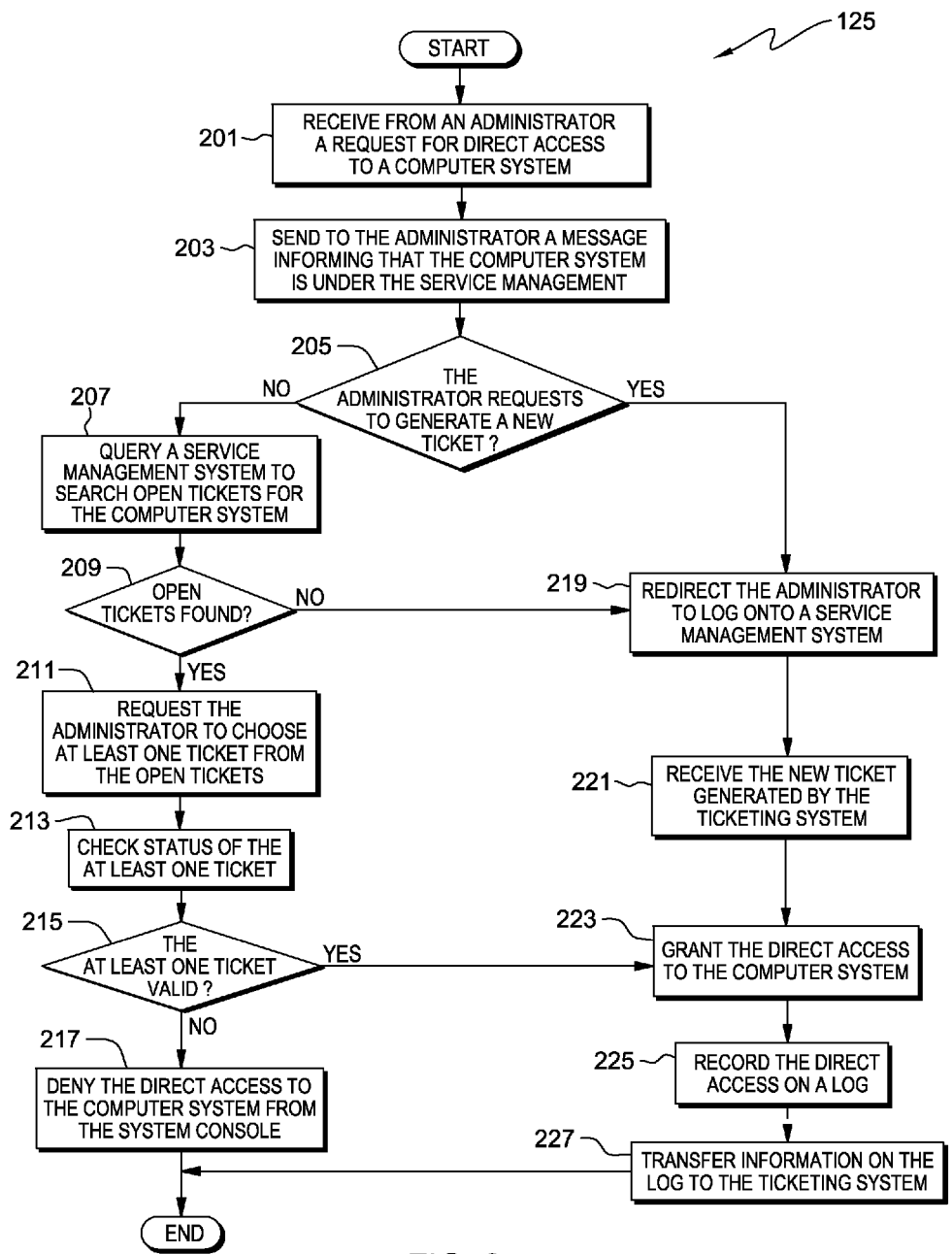
FIG. 2 is a flowchart illustrating operational steps of managing and controlling direct access of an administrator to a computer system, in accordance with an exemplary embodiment of the present invention.

FIG. 2 is a flowchart illustrating operational steps of managing and controlling direct access of an administrator to one of computer systems 120 shown in FIG. 1, in accordance with an exemplary embodiment of the present invention. In the exemplary embodiment of the invention, the operational steps are implemented by interceptor application 125 shown in FIG. 1. Interceptor application 125 is software including at least one computer program on each of computer systems 120 shown in FIG. 1.

Referring to FIG. 2, at step 201, interceptor application 125 receives a request for direct access to a specific one of computer systems 120, e.g. computer 1 120(1) shown in FIG. 1, from an administrator who performs computer service management on the specific one of computer systems 120. In the exemplary embodiment, the administrator requests for the direct access from system console 110 shown in FIG. 1. In other embodiments, the administrator requests for the direct access by using a VPN (virtual private network) or other mechanisms to bypass any boundary check.

At step 203, interceptor application 125 sends the administrator a message, informing that the specific one of computer systems 120 is under access restriction. This information may be presented using a banner, pop up or other communication.

At decision block 205, interceptor application 125 determines whether the administrator requests to generate a new ticket for management service on the specific one of computer systems 120. For example, interceptor application 125 displays one or more buttons such as "create an incident ticket", "create a problem ticket", and "create a change ticket". In response to receiving from the administrator a request for creating the new ticket (YES branch of decision block 205), at step 219, interceptor application 125 redirects the administrator to log onto ticketing system 132 on service management system 130 (shown in FIG. 1).

In response to not receiving from the administrator a request for creating the new ticket (NO branch of decision block 205), at step 207, interceptor application 125 requests ticketing system 132 to search open service management tickets. Ticketing system 132 conducts a search by querying CMDB 134 (shown in FIG. 1) which is also on service management system 130. Ticketing system 132 searches the open service management tickets by searching the text in descriptions of the open service management tickets. The text in the descriptions includes necessary information such as the hostname and/or the IP address. Ticketing system 132 may also search the open service management tickets by searching configuration items (CIs) which are tied to the specific one of computer systems 120.

At decision block 209, interceptor application 125 determines, in response to receiving the search result from ticketing system 132, whether the open service management tickets are found. At step 211 (YES branch of decision block 209), in response to that the open service management tickets are found, interceptor application 125 requests the administrator to choose at least one ticket from the open service management tickets. In response to that the open service management tickets are not found (NO branch of decision block 209), interceptor application 125, at step 219, redirects the administrator to log onto ticketing system 132 on service management system 130, in order for the administrator to have a new ticket generated by ticketing system 132.

At step 213, interceptor application 125 checks status of the at least one ticket. For example, interceptor application 125 checks whether a change ticket has the status of "in progress" or "scheduled". Interceptor application 125 determines, at decision block 215, whether the at least one ticket is valid. For example, interceptor application 125 determines that a change ticket at the status of "in progress" is valid or a change ticket at the status of "scheduled" is not valid.

In response to determining that the at least one ticket is valid, interceptor application 125, at step 223 (YES branch of decision block 215), grants the administrator the direct access to the specific one of computer systems 120. In response to determining that the at least one ticket is not valid, interceptor application 125, at step 217 (NO branch of decision block 215), denies the administrator the direct access to the specific one of computer systems 120.

After previously-mentioned step 219 at which interceptor application 125 redirects the administrator to log onto ticketing system 132, interceptor application 125 receives, at step 221, the new ticket generated for the administrator by ticketing system 132. Then, interceptor application 125 grants, at step 223, the administrator the direct access to the specific one of computer systems 120.

After previously-mentioned step 223 at which interceptor application 125 grants the administrator the direct access to the specific one of computer systems 120, interceptor application 125, at step 225, records the administrator direct access to the specific one of computer systems 120 on a log. For example, interceptor application 125 may record who, when and why the administrator logs onto the specific one of computer system 120. At step 227, interceptor application 125 transfers information of the log to ticketing system 132. The transferred information is then stored on CMDB 134.

In other embodiments, after interceptor application 125 determines whether the at least one ticket is valid at decision block 215, interceptor application 125 allows the administrator read-only access to the specific one of computer system 120, in response to determining that no ticket is valid. Thus, the administrator is given the read-only access instead of denial to the specific one of computer system 120. In other embodiments, allowing the read-only access is a substitutive step of step 217 in FIG. 2, as a "NO" branch of decision block 215. After allowing the read-only access, interceptor application 125, in a further step, logs the read-only access of the administrator.

Figure 3:
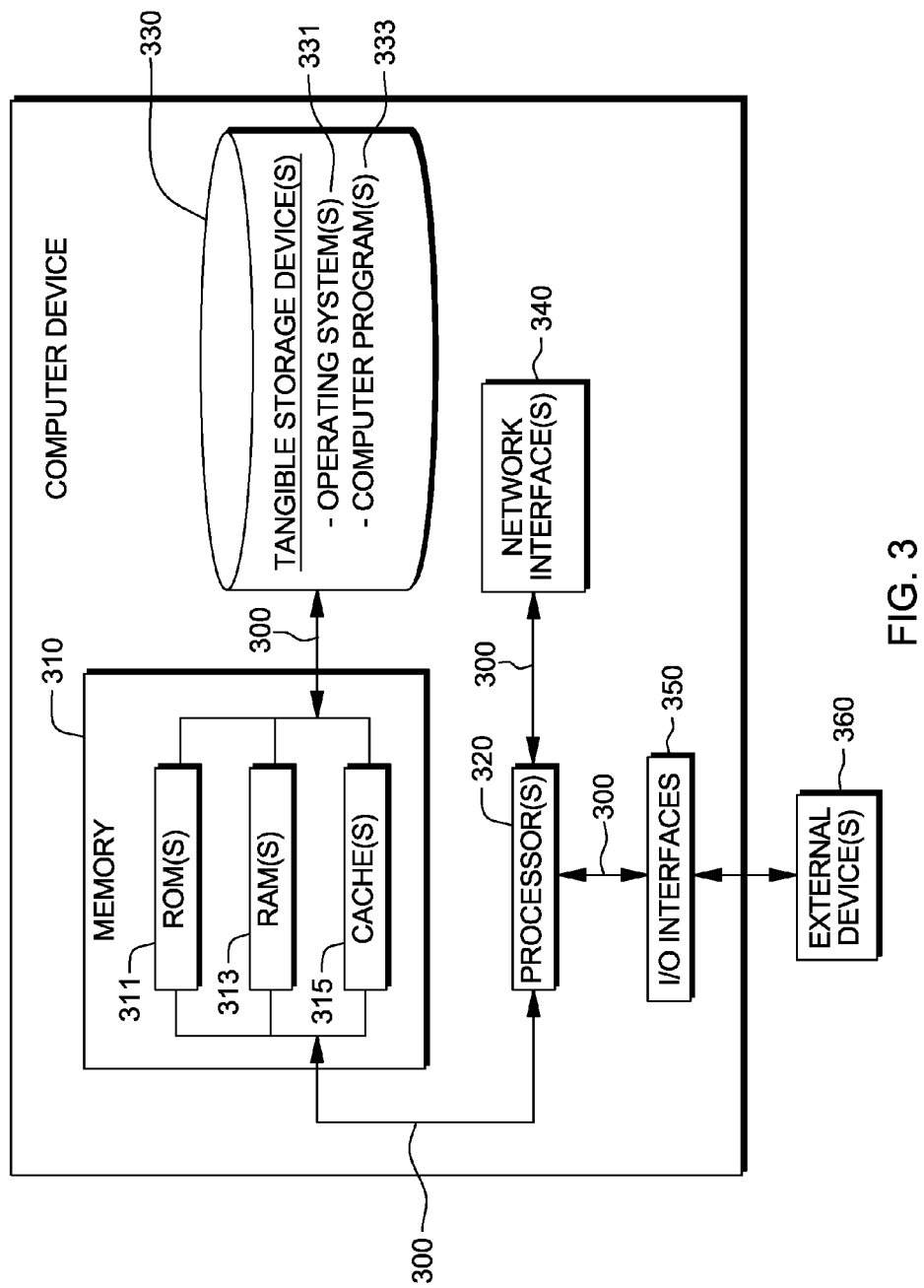
FIG. 3 is a diagram of a computer device hosting a computer system or a service management system, in accordance with an exemplary embodiment of the present invention.

FIG. 3 is a diagram of a computer device hosting one of computer systems 120 (computer 1, computer 2, . . . , or computer n) or service management system 130 (shown in FIG. 1), in accordance with an exemplary embodiment of the present invention. It should be appreciated that FIG. 3 provides only an illustration of one implementation and does not imply any limitations with regard to the environment in which different embodiments may be implemented.

Referring to FIG. 3, the computer device includes communications fabric 300 which provides communications among processor(s) 320, memory 310, tangible storage device(s) 330, network interface(s) 340, and I/O (input/output) interface(s) 350. Memory 310 includes ROM(s) (Read Only Memory) 311, RAM(s) (Random Access Memory) 313, and cache(s) 315.

One or more operating system(s) 331 and one or more computer program(s) 333 reside on one or more computer-readable tangible storage device(s) 330. In the exemplary embodiment, on each of computer systems 120 (computer 1, computer 2, . . . , or computer n), one or more computer program(s) 333 include interceptor application 125. In the exemplary embodiment, on a computer device hosting service management system 130, ticketing system 132 (shown in FIG. 1) resides on one or more computer-readable tangible storage device(s) 330. Configuration management database (CMDB) 134 (shown in FIG. 1) also resides on one or more computer-readable tangible storage device(s) 330. In other embodiments, ticketing system 132 and CMDB 134 may reside on two separate computer devices, respectively.

The computer device further includes I/O interface(s) 350. I/O interface(s) 350 allow for input and output of data with external device(s) 360 that may be connected to the computer device. The computer device further includes network interface(s) 340 for communications between the computer device and a computer network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing and controlling direct access of an administrator to a computer system, the method implemented by at least one computer program on the computer system, the method comprising:
   receiving, by an interceptor application which resides on the computer system and intercepts the direct access, from the administrator, a request for the direct access to the computer system;
   sending, by the interceptor application, the administrator a message informing that the computer system is under service management;
   requesting, by the interceptor application, a service management system to search open tickets, wherein the service management system comprising a ticketing system and a configuration management database (CMDB) storing the open tickets;
   requesting, by the interceptor application, the administrator to choose at least one ticket from the open tickets, in response to that the open tickets are found;
   checking, by the interceptor application, status of the at least one ticket to determine whether the at least one ticket is valid;
   redirecting, by the interceptor application, the administrator to log onto the service management system for generating a new ticket by the service management system, in response to that the open tickets are not found;
   receiving, by the interceptor application, from the service management system, the new ticket generated by the service management system; and
   granting, by the interceptor application, the administrator the direct access to the computer system, based on at least one of: determining that the at least one ticket is valid and determining that the new ticket is received.

2. The method of claim 1, wherein the direct access of the administrator to the computer system is through a system console, or through a mechanism of bypassing boundary check.

3. The method of claim 1, further comprising:
   denying, by the interceptor application, the administrator the direct access to the computer system, in response to determining that the at least one ticket is not valid.

4. The method of claim 1, further comprising:
   allowing, by the interceptor application, the administrator read-only access to the computer system, in response to determining that the at least one ticket is not valid.

5. The method of claim 1, further comprising:
   redirecting, by the interceptor application, the administrator to log onto the service management system, in response to that the administrator requests for a ticket generated by the service management system;
   receiving, by the interceptor application, from the service management system, the ticket generated by the service management system; and
   granting, by the interceptor application, the administrator the direct access to the computer system.

6. The method of claim 1, further comprising:
   recording, by the interceptor application, on a log the direct access of the administrator; and
   transferring, by the interceptor application, information of the log to the service management system.

7. A computer program product for managing and controlling direct access of an administrator to a computer system, the computer program product comprising:
   one or more computer-readable tangible storage devices and program instructions stored on at least one of the one or more computer-readable tangible storage devices, the program instructions comprising:
   program instructions to receive, by an interceptor application which resides on the computer system and intercepts the direct access, from the administrator, a request for the direct access to the computer system;
   program instructions to send, by the interceptor application, the administrator a message informing that the computer system is under service management;
   program instructions to request, by the interceptor application, a service management system to search open tickets, wherein the service management system comprising a ticketing system and a configuration management database (CMDB) storing the open tickets;
   program instructions to request, by the interceptor application, the administrator to choose at least one ticket from the open tickets, in response to that the open tickets are found;
   program instructions to check, by the interceptor application, status of the at least one ticket to determine whether the at least one ticket is valid;
   program instructions to redirect, by the interceptor application, the administrator to log onto the service management system for generating a new ticket by the service management system, in response to that the open tickets are not found;
   program instructions to receive, by the interceptor application, from the service management system, the new ticket generated by the service management system; and
   program instructions to grant, by the interceptor application, the administrator the direct access to the computer system, based on at least one of: determining that the at least one ticket is valid and determining that the new ticket is received.

8. The computer program product of claim 7, wherein the direct access of the administrator to the computer system is through a system console, or through a mechanism of bypassing boundary check.

9. The computer program product of claim 7, further comprising:
   program instructions to deny, by the interceptor application, the administrator the direct access to the computer system, in response to determining that the at least one ticket is not valid.

10. The computer program product of claim 7, further comprising:
   program instructions to allow, by the interceptor application, the administrator read-only access to the computer system, in response to determining that the at least one ticket is not valid.

11. The computer program product of claim 7, further comprising:
   program instructions to redirect, by the interceptor application, the administrator to log onto the service management system, in response to that the administrator requests for a ticket generated by the service management system;
   program instructions to receive, by the interceptor application, from the service management system, the ticket generated by the service management system; and
   program instructions to grant, by the interceptor application, the administrator the direct access to the computer system.

12. The computer program product of claim 7, further comprising:
   program instructions to record, by the interceptor application, on a log the direct access of the administrator; and
   program instructions to transfer, by the interceptor application, information of the log to the service management system.

13. A computer system for managing and controlling direct access of an administrator to a computer system, the computer system comprising:
   one or more processors, one or more computer-readable tangible storage devices, and program instructions stored on at least one of the one or more computer-readable tangible storage devices for execution by at least one of the one or more processors, the program instructions comprising:
   program instructions to receive, by an interceptor application which resides on the computer system and intercepts the direct access, from the administrator, a request for the direct access to the computer system;
   program instructions to send, by the interceptor application, the administrator a message informing that the computer system is under service management;
   program instructions to request, by the interceptor application, a service management system to search open tickets, wherein the service management system comprising a ticketing system and a configuration management database (CMDB) storing the open tickets;
   program instructions to request, by the interceptor application, the administrator to choose at least one ticket from the open tickets, in response to that the open tickets are found;
   program instructions to check, by the interceptor application, status of the at least one ticket to determine whether the at least one ticket is valid;
   program instructions to redirect, by the interceptor application, the administrator to log onto the service management system for generating a new ticket by the service management system, in response to that the open tickets are not found;
   program instructions to receive, by the interceptor application, from the service management system, the new ticket generated by the service management system; and
   program instructions to grant, by the interceptor application, the administrator the direct access to the computer system, based on at least one of: determining that the at least one ticket is valid and determining that the new ticket is received.

14. The computer system of claim 13, wherein the direct access of the administrator to the computer system is through a system console, or through a mechanism of bypassing boundary check.

15. The computer system of claim 13, further comprising:
   program instructions to deny, by the interceptor application, the administrator the direct access to the computer system, in response to determining that the at least one ticket is not valid.

16. The computer system of claim 13, further comprising:
   program instructions to allow, by the interceptor application, the administrator read-only access to the computer system, in response to determining that the at least one ticket is not valid.

17. The computer system of claim 13, further comprising:
   program instructions to redirect, by the interceptor application, the administrator to log onto the service management system, in response to that the administrator requests for a ticket generated by the service management system;
   program instructions to receive, by the interceptor application, from the service management system, the ticket generated by the service management system; and
   program instructions to grant, by the interceptor application, the administrator the direct access to the computer system.

18. The computer system of claim 13, further comprising:
   program instructions to record, by the interceptor application, on a log the direct access of the administrator; and
   program instructions to transfer, by the by the interceptor application, information of the log to the service management system.

* * * * *